(12) United States Patent
Huang et al.

(10) Patent No.: US 7,839,043 B2
(45) Date of Patent: Nov. 23, 2010

(54) ROTARY STRUCTURE OF PERMANENT MAGNET ELECTRIC MACHINERY AND METHOD FOR DETERMINING THE STRUCTURE THEREOF

(75) Inventors: Shih-Ming Huang, Taoyuan County (TW); Wen-Shi Huang, Taoyuan County (TW); Li-Jian Wu, Shanghai (CN); Wan-Bing Jin, Shanghai (CN); Jian-Ping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 465 days.

(21) Appl. No.: 11/846,001

(22) Filed: Aug. 28, 2007

(65) Prior Publication Data

US 2008/0150386 A1    Jun. 26, 2008

(30) Foreign Application Priority Data

Dec. 21, 2006    (TW)    .............................. 95148295 A

(51) Int. Cl.
    *H02K 21/12*    (2006.01)
(52) U.S. Cl. .............................. 310/156.38; 310/156.46
(58) Field of Classification Search ............ 310/156.38, 310/156.41, 156.43, 156.45, 156.46
    See application file for complete search history.

(56) References Cited

U.S. PATENT DOCUMENTS

| 5,233,250 | A  | * | 8/1993  | De Filippis | ............ 310/156.45 |
| 6,181,035 | B1 | * | 1/2001  | Acquaviva   | ................... 310/51 |
| 2005/0258698 | A1 |   | 11/2005 | Miyashita et al. | |

* cited by examiner

*Primary Examiner*—Dang D Le
(74) *Attorney, Agent, or Firm*—Volpe and Koenig, P.C.

(57) ABSTRACT

A rotary structure of a permanent magnet electric machine including a stator and a rotor is provided. The stator has K salient teeth peripherally spaced with equal intervals for forming K winding slots, wherein K is a natural number greater than 1. The rotor has an annular inner surface and has P pairs of permanent magnets peripherally spaced with equal intervals along the inner surface for rotating around the stator, wherein P is a natural number. Each permanent magnet having two sides along a peripheral direction of the rotor includes a pair of inclined surfaces on the two sides, the pair of inclined surfaces is symmetric with respect to a radial plane of the each permanent magnet, and an inclined angle α between the inclined surface and the radial plane is selected from a range of $90(1-1/(4P))<\alpha<90(1+1/(4P))$.

13 Claims, 8 Drawing Sheets

US 7,839,043 B2

ROTARY STRUCTURE OF PERMANENT MAGNET ELECTRIC MACHINERY AND METHOD FOR DETERMINING THE STRUCTURE THEREOF

FIELD OF THE INVENTION

The present invention relates to a rotary structure of permanent magnet electric machinery and a method for determining the structure thereof, and more particularly to a rotary structure of permanent magnet electric machinery for decreasing the cogging torque and the windage loss and increasing air heat radiation.

BACKGROUND OF THE INVENTION

Advantages of a permanent magnet electric machine include simple structure, reliable running, small size, lightness, little loss, high efficiency, and that its shape and dimension can be easily varied, so that it is applied to many fields which spread almost all over the daily life, agriculture, aviation, aerospace, national defense, and general industries.

Please refer to FIG. 1, which is a cross-section diagram showing a rotary structure of a conventional permanent magnet electric machine having an outer rotor. In FIG. 1, a permanent magnet motor having eight poles and six slots is used as an example to describe the rotary structure 801 of the permanent magnet electric machine. The rotary structure 801 includes a stator 30 and a rotor 40. The stator 30 on which a rotating magnetic field can be produced is cylindrical in shape and is fixed to the interior of the permanent magnet electric machine. The rotor 40 having a rotor magnetic field is annular in shape, coaxial with the stator 30, and around the stator 30. When the rotor magnetic field is interacted with the rotating magnetic field of the stator 30, a rotary motion is produced on the rotor 40.

The stator 30 of the rotary structure 801 includes a stator core 1, a stator shaft 2, and six windings 3. The stator core 1 is mounted on the stator shaft 2 and is composed of permeability magnetic material. Six salient teeth 5 wound by the six windings 3 are protruded from the stator core 1 for forming six winding slots 4 and six winding slit orifices 6. Driving currents flow through the six windings 3 for producing the rotating magnetic field of the stator 30.

The rotor 40 of the rotary structure 801 includes a rotor yoke 7 and eight permanent magnets 8. The rotor yoke 7 is annular in shape. The eight permanent magnets are peripherally spaced with equal intervals along a peripheral direction on an inner surface of the rotor yoke 7 and alternatively change magnetic polarities between N pole and S pole thereof. Each permanent magnet 8 is a magnetic pole composed of permanent magnetic material. The rotor 40 rotates around the stator 30 with respect to the stator shaft 2, and the space enclosed by inner surfaces of the permanent magnets 8 and outer surfaces of the salient teeth 5 and the winding slit orifices 6 of the stator 30 forms an air gap 9.

In FIG. 1, electric currents high enough are set up in the windings to make the rotor 40 rotate as required. As the permanent magnets 8 are interacted with the winding slots 4 and the winding slit orifices 6, a cogging torque is produced, which denotes that an torque fluctuation is induced when a magnetomotive force distribution of the permanent magnets 8 is interacted with an air gap permeance distribution produced by the existence of the slots in the stator 30. Therefore, according to the definition, a torque induced by rotating of the rotor is the cogging torque in the absence of the driving currents.

The problem caused by the cogging torque is that the cogging torque results in the fluctuation of an output torque, influences the rotation thereof, and produces a speed fluctuation, vibration and noise.

At the same time, losses such as copper loss and core loss in the interior of the electric machine can make the iron core, the windings and the permanent magnets heated, thereby causing the temperature of the electric machine to rise. The air gap between the stator and the rotor in much electric machinery is used to form an air channel for air heat radiation.

The performance of the electric machine is significantly influenced by the configuration of the air gap between the stator and the rotor. In general, the air gap cannot be too thick so that the effect of air heat radiation is confined, thereby making the temperature of the electric machine too high.

Please refer to FIG. 2, which is a cross-section diagram showing a rotary structure of a conventional permanent magnet electric machine disclosed in the US Publication No. 2005/0258698 A1 and having a low cogging torque and a high torque density. In FIG. 2, P pairs of permanent magnets are peripherally spaced with equal intervals along a peripheral direction on a surface of a rotor iron 11 or a rotor shaft 11 of the permanent magnet electric machine. A magnetic pole surface 13b of each permanent magnet 13 has an arc surface 13c and a pair of inclined surfaces 13d. The arc surface 13c is in the middle of the magnetic pole surface 13b along the peripheral direction and forms an air gap with a stator of the electric machine. The pair of inclined surfaces 13d is located on two sides of the arc surface 13c along the peripheral direction and is inclined to deviate from the surface of the stator magnetic pole when being away from the arc surface 13c, so as to make the air gap gradually expanded.

Here, a first pole arc ratio $\Psi_1$ for the arc surface 13c of the each permanent magnet 13 is defined as $\Psi_1=\theta_1/(180/2P)$, and a second pole arc ratio $\Psi_2$ for the each permanent magnet 13 is defined as $\Psi_2=\theta_2/(180/2P)$. As a result, a non-dimension angle corresponding to the pair of inclined surfaces 13d along the peripheral direction satisfies a range of $P/K \leq \Psi_2 - \Psi_1 \leq 1.38 \times P/K$, and an inclined angle θ for the pair of inclined surfaces 13d with respect to a radial plane PS of the each permanent magnet is given within a range of (70°-45°/P)~(80°-45°/P), wherein K is the number of winding slots in the stator of the permanent magnet electric machine.

Although it can decrease the cogging torque that the pair of inclined surfaces 13d is added on the two sides of each permanent magnet 13 along a peripheral direction, the inclined angle given in the US Publication No. 2005/0258698 A1 for the pair of inclined surfaces 13d of each permanent magnet 13 cannot accomplish a very good effect to decrease a cogging torque, while applied to an electric machine having an outer rotor. Additionally, the inclined angle given in the US Publication No. 2005/0258698 A1 for the pair of inclined surfaces 13d of each permanent magnet 13 only considers the cogging torque and the torque density but doesn't consider air heat radiation and a windage loss of the rotor for the electric machine, wherein the windage loss denotes a mechanical loss produced by the inter-rubs of the rotor surface rotating at high speed with air.

In sum, in order to better decrease a cogging torque for a permanent magnet electric machine having an outer rotor, an inclined angle of a pair of inclined surfaces for each permanent magnet should be further determined in accordance with experimental results considering air heat radiation, and a windage loss of the rotor for the electric machine.

SUMMARY OF THE INVENTION

It is therefore an aspect of the present invention to provide a rotary structure of a permanent magnet electric machine and a method for determining the structure thereof. The rotary structure includes an inner stator and an outer rotor. The outer surface of the inner stator has K salient teeth for forming K winding slots. The inner surface of the outer rotor has P pairs of permanent magnets. A pair of inclined surfaces is formed on two sides of each permanent magnet along a peripheral direction and is symmetric with respect to a radial plane of the each permanent magnet. The inclined angle of the pair of inclined surfaces is determined by measuring variance profiles varying with the inclined angle for a windage loss, a temperature of the electric machine, an air flow rate, an electric loss and a cogging torque so as to accomplish effects of a low windage loss, a high air heat radiation, and a low cogging torque.

According to the aspect of the present invention, a rotary structure of a permanent magnet electric machine includes a stator and a rotor. The outer surface portion of the stator being cylindrical in shape has K salient teeth peripherally spaced with equal intervals for forming K winding slots, wherein K is a natural number greater than 1. The inner surface portion of the rotor being annular in shape has P pairs of permanent magnets peripherally spaced with equal intervals, and the rotor can rotate around the stator, wherein P is a natural number.

Each permanent magnet having two sides along a peripheral direction of the rotor includes a pair of inclined surfaces on the two sides. The pair of inclined surfaces is symmetric with respect to a radial plane of the each permanent magnet. An inclined angle $\alpha$ between the inclined surface and the radial plane is selected from a range of $90(1-1/(4P))<\alpha<90(1+1/(4P))$ for decreasing a cogging torque and a windage loss and increasing air heat radiation.

According to the aspect of the present invention, a method for determining a rotary structure of a permanent magnet electric machine includes the following steps. Firstly, a pair of inclined surfaces is formed on two sides along a peripheral direction of the rotor, wherein the pair of inclined surfaces having an inclined angle is symmetric with respect to a radial plane of the each permanent magnet. Next, variance profiles varying with the inclined angle for a windage loss, a temperature of the electric machine, and a cogging torque are measured, and the temperature change of the electric machine is verified by using an air flow rate and an electrical loss. Subsequently, the inclined angle $\alpha$ satisfying a $90(1-1/(4P))<\alpha<90(1+1/(4P))$ relation is determined, with each of the windage loss, the temperature of the electric machine and the cogging torque being at a respective lower value.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
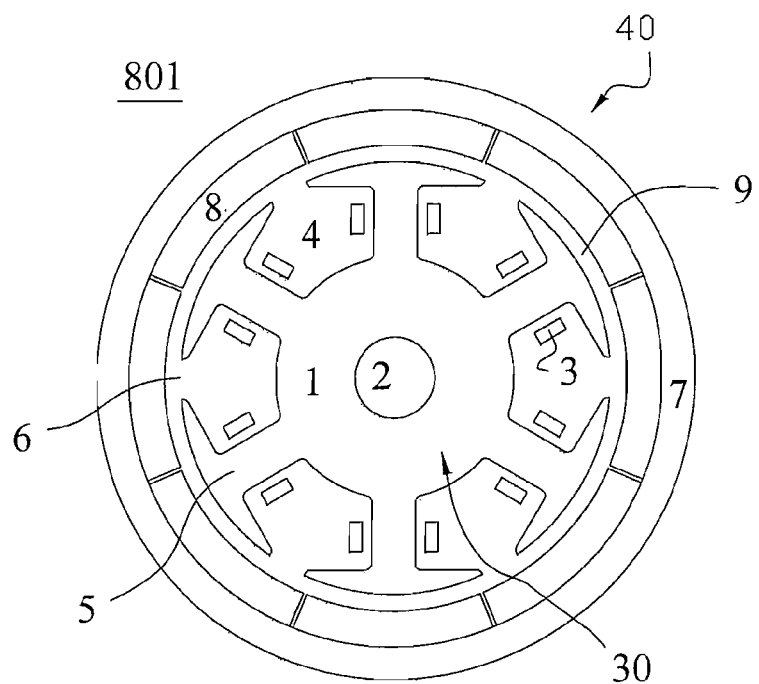
FIG. 1 is a cross-section diagram showing a rotary structure of a conventional permanent magnet electric machine having an outer rotor.
Figure 2:
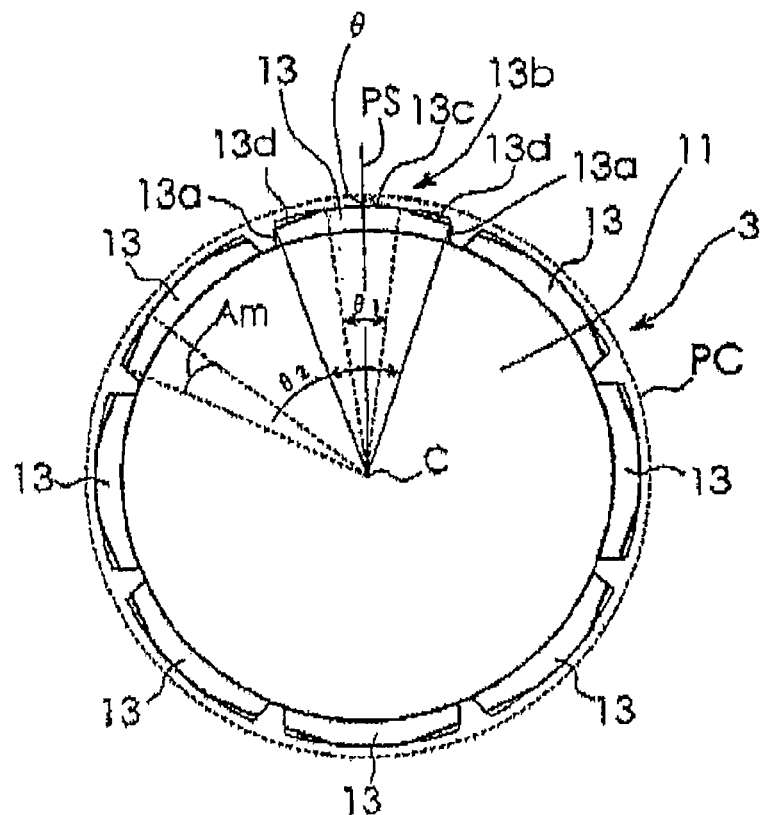
FIG. 2 is a cross-section diagram showing a rotary structure of a conventional permanent magnet electric machine disclosed in the US Publication No. 2005/0258698 A1 and having a low cogging torque and a high torque density.
Figure 3:
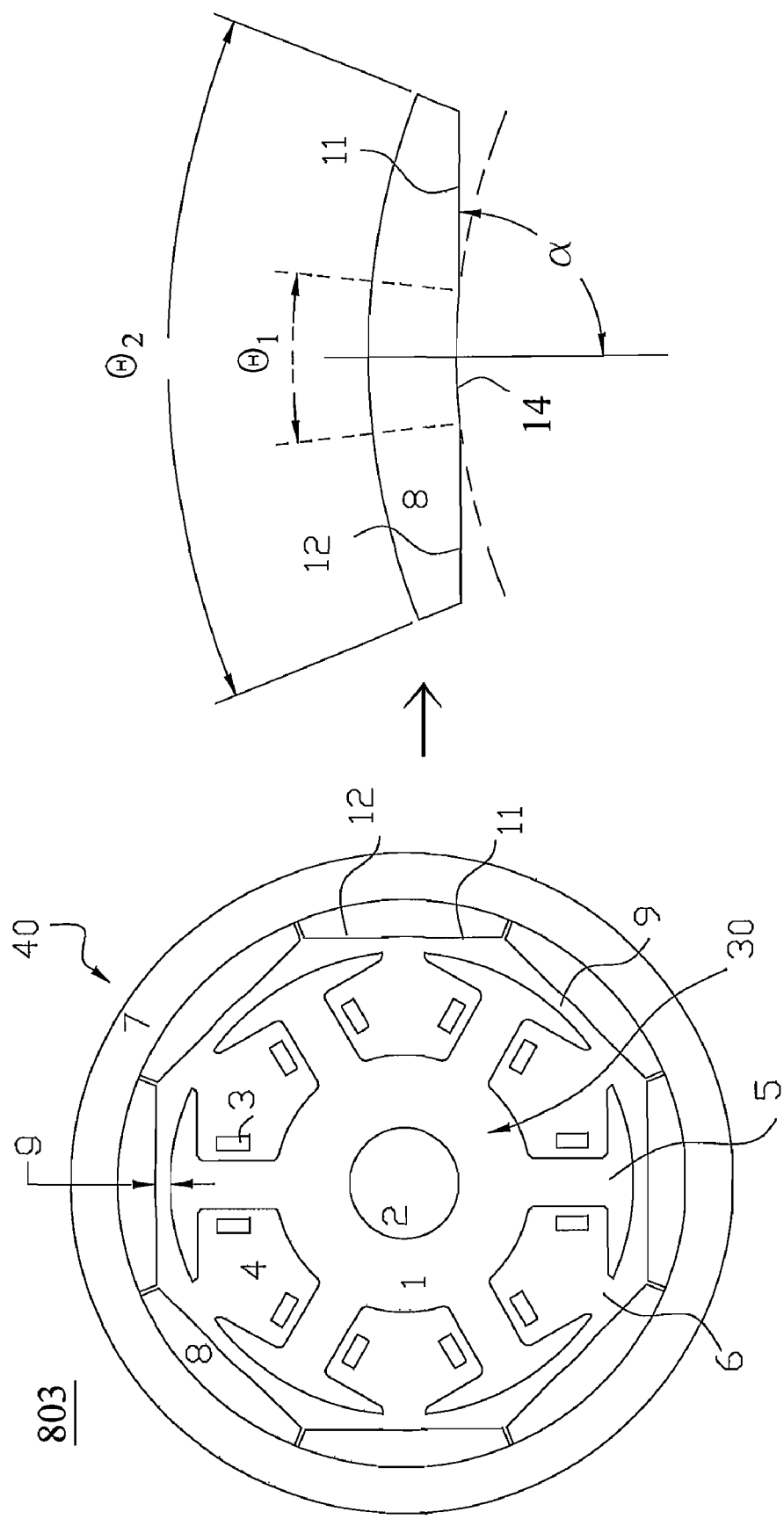
FIG. 3 is a cross-section diagram showing a rotary structure of a permanent magnet electric machine according to the first embodiment of the present invention.

Please refer to FIG. 3, which is a cross-section diagram showing a rotary structure of a permanent magnet electric machine according to the first embodiment of the present invention. The rotary structure 803 of the permanent magnet electric machine in FIG. 3 is obtained based on that in FIG. 1 and the features for decreasing a cogging torque are further incorporated thereinto. The rotary structure 803 is a permanent magnet motor having eight poles and six slots but is not limited to the permanent magnet motor, so that a similar structure is also applied to a permanent magnet generator. The rotary structure 803 includes a stator 30 and a rotor 40. A cylindrical shape stator 30 on which a rotating magnetic field is produced is fixed in the interior of the permanent magnet electric machine. The rotor 40 having a rotor magnetic field is annular in shape, coaxial with the stator 30, and around the stator 30. When the rotor magnetic field is interacted with the rotating magnetic field, the rotor 40 makes itself a rotary motion.

The stator 30 of the rotary structure 803 includes a stator core 1, a stator shaft 2, and six windings 3. The stator core 1 is mounted on the stator shaft 2 and is composed of permeability magnetic material. Six salient teeth 5 wound by six windings 3 are extensions of the stator core 1 for forming six winding slots 4 and six winding slit orifices 6. Driving currents flow through the six windings 3 for producing the rotating magnetic field of the stator.

The rotor 40 of the rotary structure 801 includes a rotor yoke 7 and eight permanent magnets 8. The rotor yoke 7 is annular in shape. The eight permanent magnets 8 are peripherally spaced with equal intervals along a peripheral direction on an inner surface of the rotor yoke 7 and alternatively change magnetic polarities between N pole and S pole thereof. Each permanent magnet 8 is a magnetic pole composed of permanent magnetic material. The rotor 40 rotates around the stator 30 with respect to the stator shaft 2, and the space enclosed by inner surfaces of the permanent magnets 8 and outer surfaces of the salient teeth 5 and the winding slit orifices 6 of the stator 30 forms an air gap 9.

Besides, each permanent magnet 8 having two sides along a peripheral direction of the rotor 40 includes a pair of inclined surfaces 11 and 12 on the two sides and includes an arc surface 14 between the pair of inclined surfaces 11 and 12 which is symmetric with respect to a radial plane of the each permanent magnet 8. Dimensions of the pair of inclined surfaces 11 and 12 are determined by factors of decreasing a cogging torque and a windage loss and increasing air heat radiation.

In order to conveniently employ symbols to describe the subject of the cogging torque, the symbols are attached to the rotary structure 803 as follows. The rotary structure 803 includes the stator 30 and the rotor 40. The outer surface portion of the stator 30 forms K salient teeth 5 equidistantly distributed there for forming K winding slots 4, wherein K is a natural number greater than 1. The inner surface portion of the rotor 40 forms P pairs of permanent magnets 8 equidistantly distributed there, wherein P is a natural number. Each inclined angle of the pair of inclined surfaces 11 and 12 with respect to the radial plane is denoted as $\alpha$. An angle corresponding to the each permanent magnet 8 along the peripheral direction is denoted as $\theta_2$ in electrical degree. An angle corresponding to the arc surface 14 along the peripheral direction is denoted as $\theta_1$ in electrical degree. An angle totally corresponding to the pair of inclined surfaces along the peripheral direction is denoted as $(\theta_2-\theta_1)$ in electrical degree. A first arc rate $\Psi_1$ of the each permanent magnet 8 is defined as $\Psi_1=\theta_1/(180/2P)$, and a second arc rate $\Psi_2$ of the each permanent magnet 8 is defined as $\Psi_2=\theta_2/(180/2P)$.

The magnitude of the inclined angle $\alpha$ significantly influences effects on the cogging torque, the windage loss and air heat radiation, and relations among them are described in detail as follows.

Figure 4:
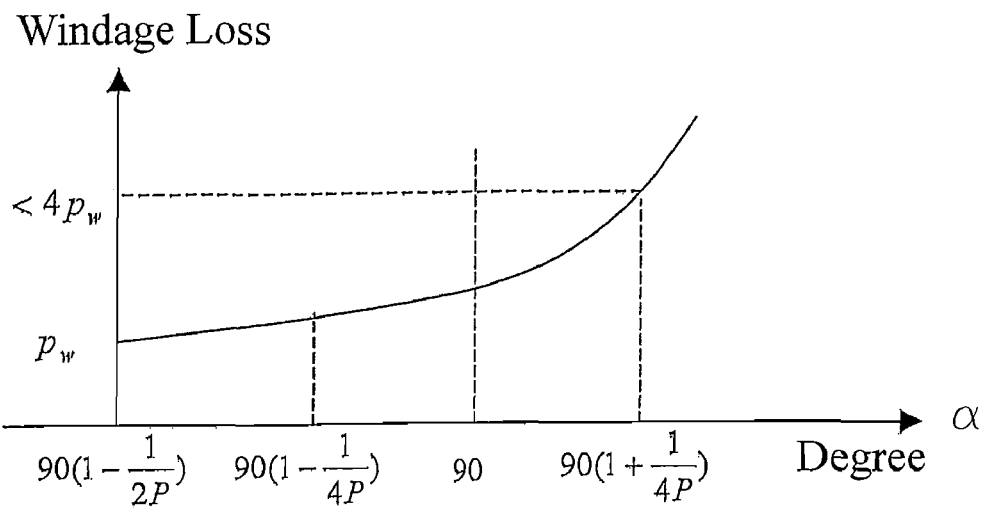
FIG. 4 is a schematic diagram showing a variance profile for a windage loss varying with the inclined angle according to the first embodiment of the present invention.

Please refer to FIG. 4, which is a schematic diagram showing a variance profile for a windage loss varying with the inclined angle according to the first embodiment of the present invention. In FIG. 4, as the inclined angle $\alpha$ gradually increases from $90(1-1/(2P))$ degrees, the windage loss also gradually increases. As the inclined angle $\alpha$ reaches 90 degrees, the curve of the windage loss has a bend. As the inclined angle $\alpha$ is greater than 90 degrees, the windage loss abruptly increases with the increase of the inclined angle $\alpha$. Therefore, when the inclined angle $\alpha$ is assured to satisfy $\alpha<90(1+1/(4P))$, the windage loss can be controlled to the range within four times the minimum windage loss.

Figure 5:
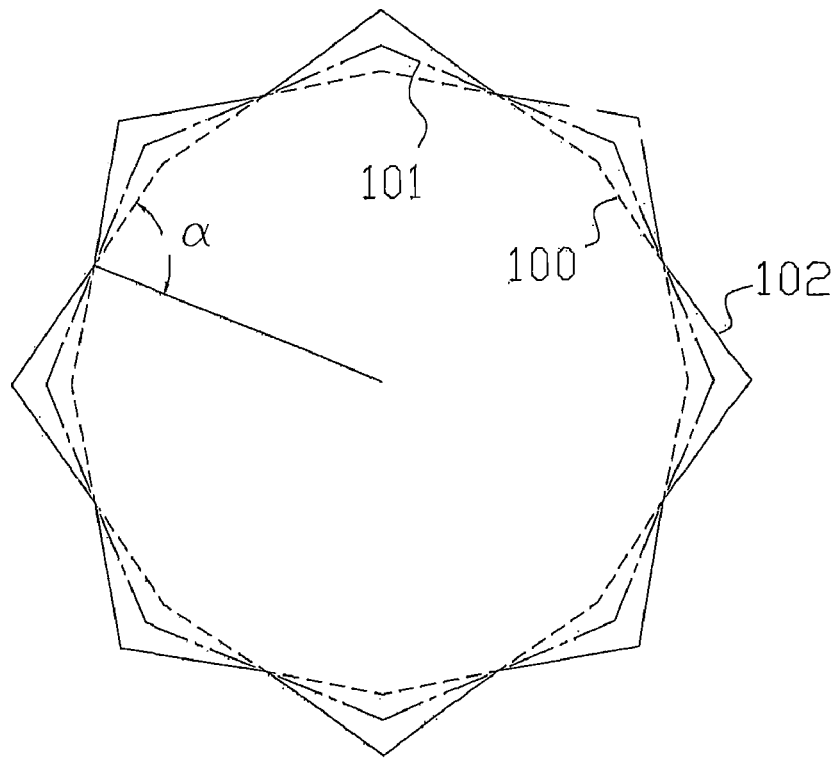
FIG. 5 is a schematic diagram showing inclined angles for inclined surfaces of permanent magnets according to the first embodiment of the present invention.

Next, the phenomenon of FIG. 4 is illustrated in a schematic diagram. Please refer to FIG. 5, which is a schematic diagram showing inclined angles for inclined surfaces of permanent magnets according to the first embodiment of the present invention. In FIG. 5, as the inclined angle $\alpha$ satisfies $\alpha=90(1-1/(2P))$, inner surfaces of the eight permanent magnets 8 form a regular polygon 100 having sixteen sides. As the inclined angle $\alpha$ is 90 degrees, inner surfaces of the eight permanent magnets 8 form a regular octagon 101. As the inclined angle $\alpha$ is gradually increased from $90(1-1/(2P))$ to 90 degrees, inner surfaces of the eight permanent magnets 8 are also varied from curve 100 to curve 101 between which an inside angle formed between the inclined surfaces 11 and 12 doesn't exceed an angle of 180 degrees. Hence, factors, such as the perimeter of the inner surfaces elongating and so on, make the windage loss gradually increase. As the inclined angle $\alpha$ is greater than 90 degrees, inner surfaces of the eight permanent magnets 8 shown as a curve 102 form an irregular polygon and the inside angle between the inclined surfaces 11 and 12 can exceed an angle of 180 degrees. As the rotor 40 with the irregular polygon rotates, a very great resistance can be produced, thereby making the windage loss abruptly increase.

Figure 6:
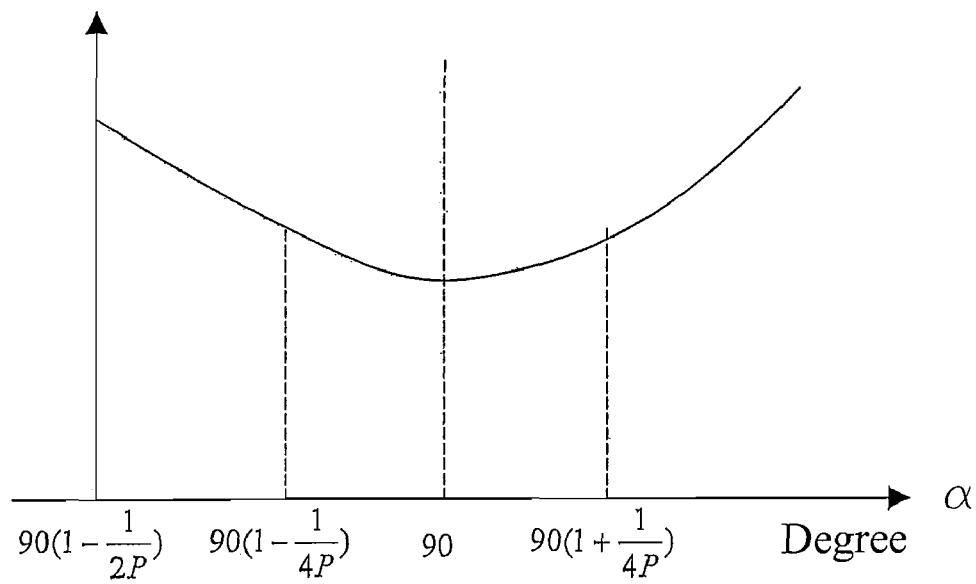
FIG. 6 is a schematic diagram showing a variance profile for a temperature of the electric machine varying with the inclined angle according to the first embodiment of the present invention.

Please continuously refer to FIG. 6, which is a schematic diagram showing a variance profile for a temperature of the electric machine varying with the inclined angle according to the first embodiment of the present invention. In FIG. 6, as the inclined angle $\alpha$ gradually increases from $90(1-1/(2P))$ degrees, the temperature of the electric machine significantly decreases. As the inclined angle $\alpha$ is near 90 degrees, the curve for the temperature of the electric machine has the minimum point. As the inclined angle $\alpha$ is greater than 90 degrees, the temperature of the electric machine begins to increase with the increase of the inclined angle $\alpha$.

Figure 7:
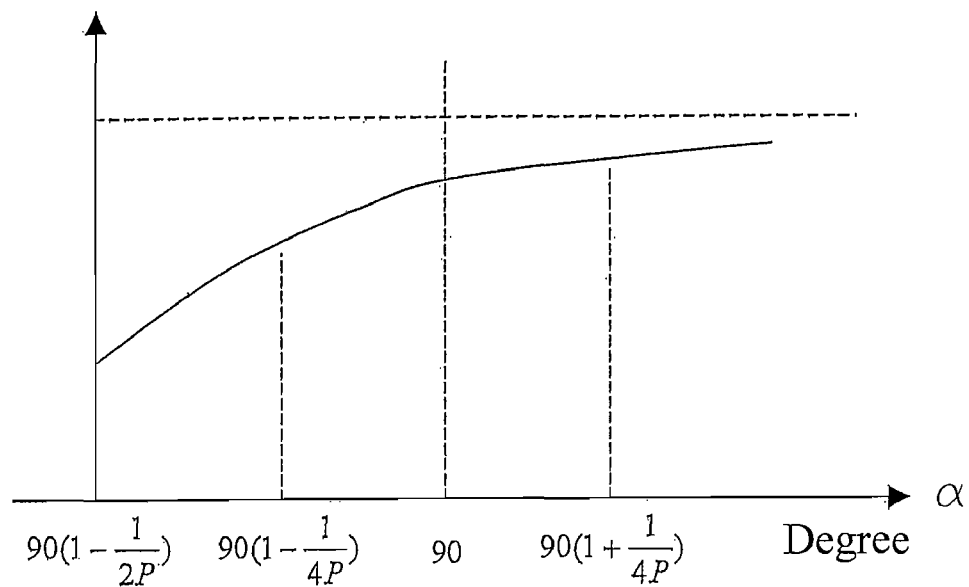
FIG. 7 is a schematic diagram showing a variance profile for an air flow rate varying with the inclined angle according to the first embodiment of the present invention.

Afterwards, the temperature change of the electric machine is verified by using an air flow rate and an electrical loss. Please refer to FIG. 7, which is a schematic diagram showing a variance profile for an air flow rate varying with the inclined angle according to the first embodiment of the present invention. In FIG. 7, because of the increment of the inclined angle $\alpha$, a cross-section area of the air gap 9 between the stator 30 and the rotor 40 increases so that the air flow rate increases with the increase of the inclined angle $\alpha$. Air heat radiation chiefly distributes on the surface of the stator 30. As the inclined angle $\alpha$ is greater than 90 degrees, the increased volume of the air gap 9 is located away from the surface of the stator 30 so that the contribution to the air heat radiation decreases. As the inclined angle $\alpha$ is less than 90 degrees, the air heat radiation can significantly increase with the increase of the inclined angle $\alpha$. As the inclined angle $\alpha$ is greater than 90 degrees, the increment of the air heat radiation slows down.

Figure 8:
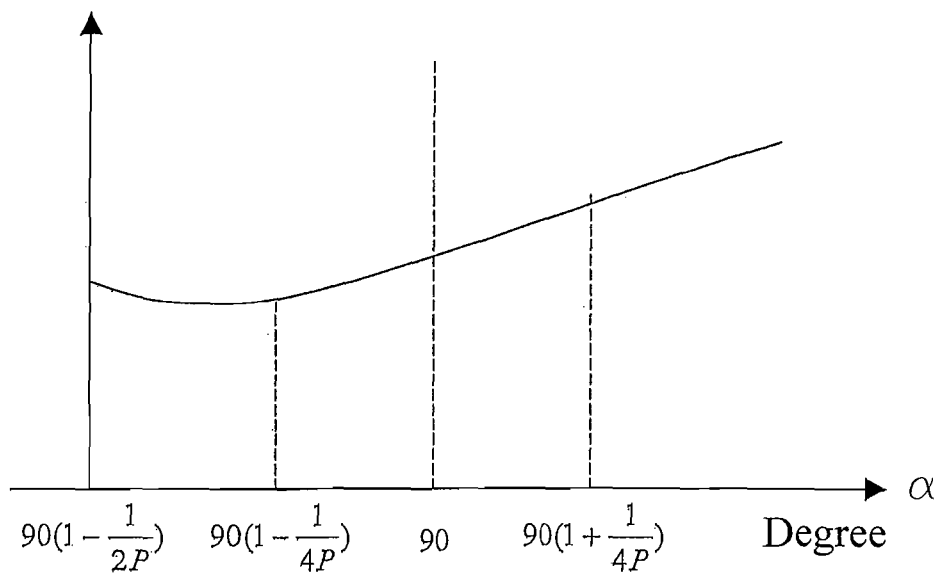
FIG. 8 is a schematic diagram showing a variance profile for an electric loss varying with the inclined angle according to the first embodiment of the present invention.

Please refer to FIG. 8, which is a schematic diagram showing a variance profile for an electrical loss varying with the inclined angle according to the first embodiment of the present invention. In FIG. 8, the electrical loss (core loss and copper loss) varies with the inclined angle $\alpha$. As the inclined angle $\alpha$ is less than 90 degrees, a volume change chiefly exists in a common boundary between N and S poles. The magnetic field chiefly contributed from material of permanent magnet 8 in the common boundary between N and S poles is a leakage magnetic field having little effect to the main magnetic field. Therefore, the counter electromotive force of the electric machine is essentially unchangeable, that is, efficiency of the electric machine is also essentially unchangeable. As the inclined angle $\alpha$ is greater than 90 degrees, the inclined surfaces gradually influence the main portion of material of the permanent magnet, which weakens the counter electromotive force of windings of the electric machine, thereby making loss rapidly increase.

The phenomenon in FIG. 6 can be verified through FIG. 7 and FIG. 8. As the inclined angle $\alpha$ is less than 90 degrees, the air heat radiation obviously increases and the electrical loss is essentially unchangeable so that the temperature of the electric machine rapidly decreases. As the inclined angle $\alpha$ is greater than 90 degrees, the air heat radiation doesn't vary greatly and the electrical loss obviously increases so that the temperature of the electric machine rapidly increases. As the inclined angle α is near 90 degrees, the temperature of the electric machine has the minimum value.

Figure 9:
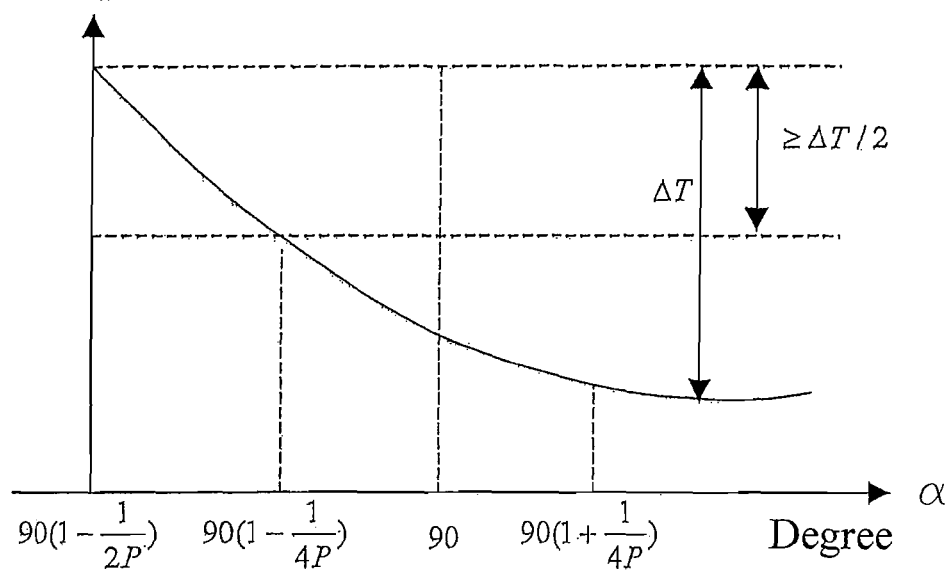
FIG. 9 is a schematic diagram showing a variance profile for a peak cogging torque varying with the inclined angle according to the first embodiment of the present invention.

Please refer to FIG. 9, which is a schematic diagram showing a variance profile for a peak cogging torque varying with the inclined angle according to the first embodiment of the present invention. In FIG. 9, as the inclined angle α gradually increases from 90(1−1/(2P)) degrees, the peak cogging torque of the electric machine decreases obviously. As the inclined angle α reaches near 90 degrees, the variation trend slows down. As long as the inclined angle α is within a range of 90(1−1/(4P))<α<90(1+1/(4P)), the drop of the peak cogging torque can be assured to reach at least 50% of the maximum probable drop by the technique of the inclined surfaces.

In sum, as the factors like decreasing a cogging torque and a windage loss and increasing air heat radiation etc. are considered, the optimal value of the inclined angle α is 90 degrees and the optimal range is 90(1−1/(4P))<α<90(1+1/(4P)).

Figure 10:
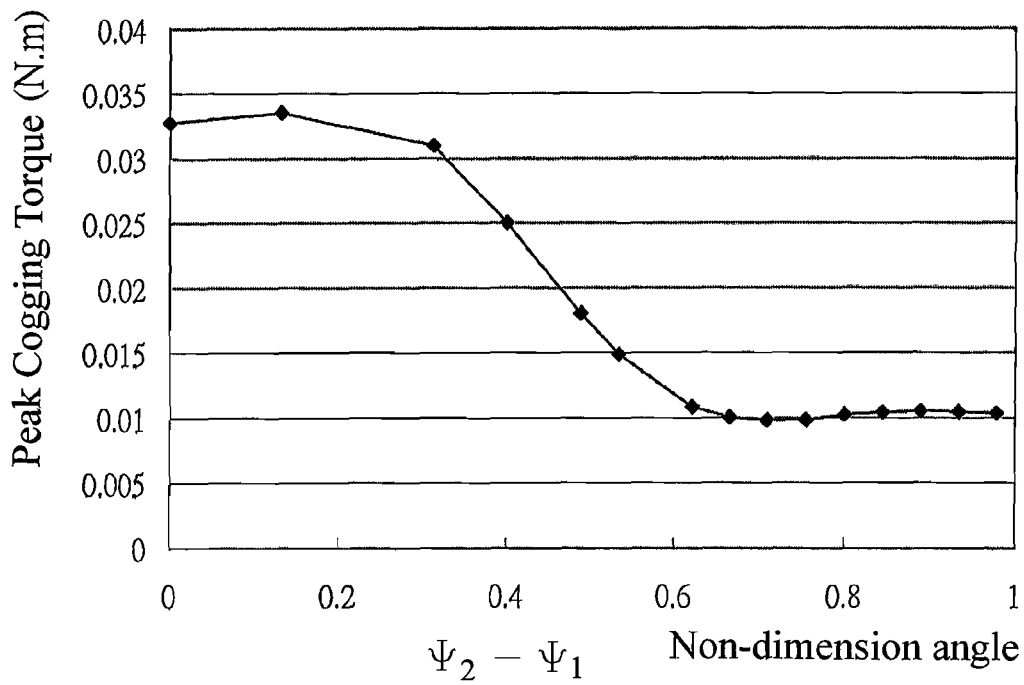
FIG. 10 is a schematic diagram showing a first variance profile for the peak cogging torque varying with the corresponding angle of an inclined surface according to the first embodiment of the present invention.

As the angle (θ2−θ1) corresponding to the pair of inclined surfaces 11 and 12 along the peripheral direction also has very important effect on the cogging torque and the output torque of the electric machine, description is given as follows. Please refer to FIG. 10, which is a schematic diagram showing a first variance profile for the peak cogging torque varying with the corresponding angle of an inclined surface according to the first embodiment of the present invention. In FIG. 10, compared to the condition without inclined surfaces, as the non-dimension angle $\Psi_2-\Psi_1$ totally corresponding to the pair of inclined surfaces along the peripheral direction is within a range of $0.75\times P/K \leq \Psi_2-\Psi_1$, the peak cogging torque decreases obviously. Take the electric machine having outer rotor and having eight poles and six slots for example, the aforementioned range is $0.5 \leq \Psi_2-\Psi_1$.

Figure 11:
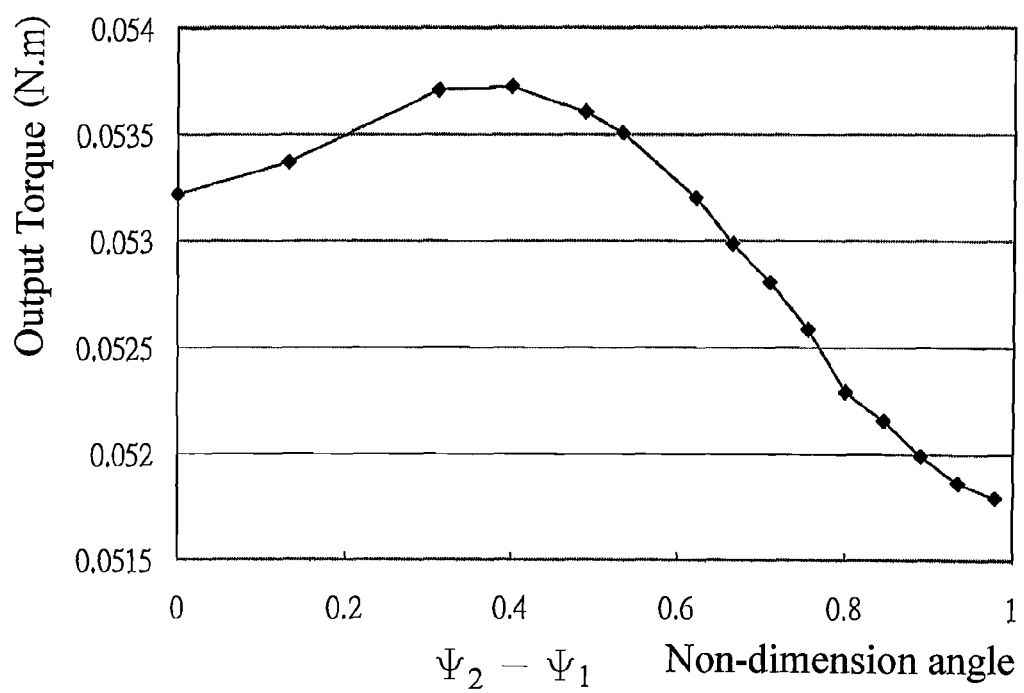
FIG. 11 is a schematic diagram showing a variance profile for an output torque varying with the corresponding angle of an inclined surface according to the first embodiment of the present invention.

Please refer to FIG. 11, which is a schematic diagram showing a variance profile for an output torque varying with the corresponding angle of an inclined surface according to the first embodiment of the present invention. In FIG. 11, compared to the condition without inclined surfaces, as the non-dimension angle $\Psi_2-\Psi_1$ totally corresponding to the pair of inclined surfaces along the peripheral direction is within a range of $0.3\times P/K \leq \Psi_2-\Psi_1 \leq 0.75\times P/K$, the output torque is greater. Take the electric machine having outer rotor and having eight poles and six slots for example, the aforementioned range is $0.2 \leq \Psi_2-\Psi_1 \leq 0.5$.

Furthermore, compared to the condition without inclined surfaces, as the non-dimension angle $\Psi_2-\Psi_1$ totally corresponding to the pair of inclined surfaces along the peripheral direction is within a range of $0.75\times P/K \leq \Psi_2-\Psi_1 \leq 1.125\times P/K$, the output torque decreases slightly but the peak cogging torque increases significantly. Take the electric machine having outer rotor and having eight poles and six slots for example, the aforementioned range is $0.5 \leq \Psi_2-\Psi_1 \leq 0.75$.

Figure 12:
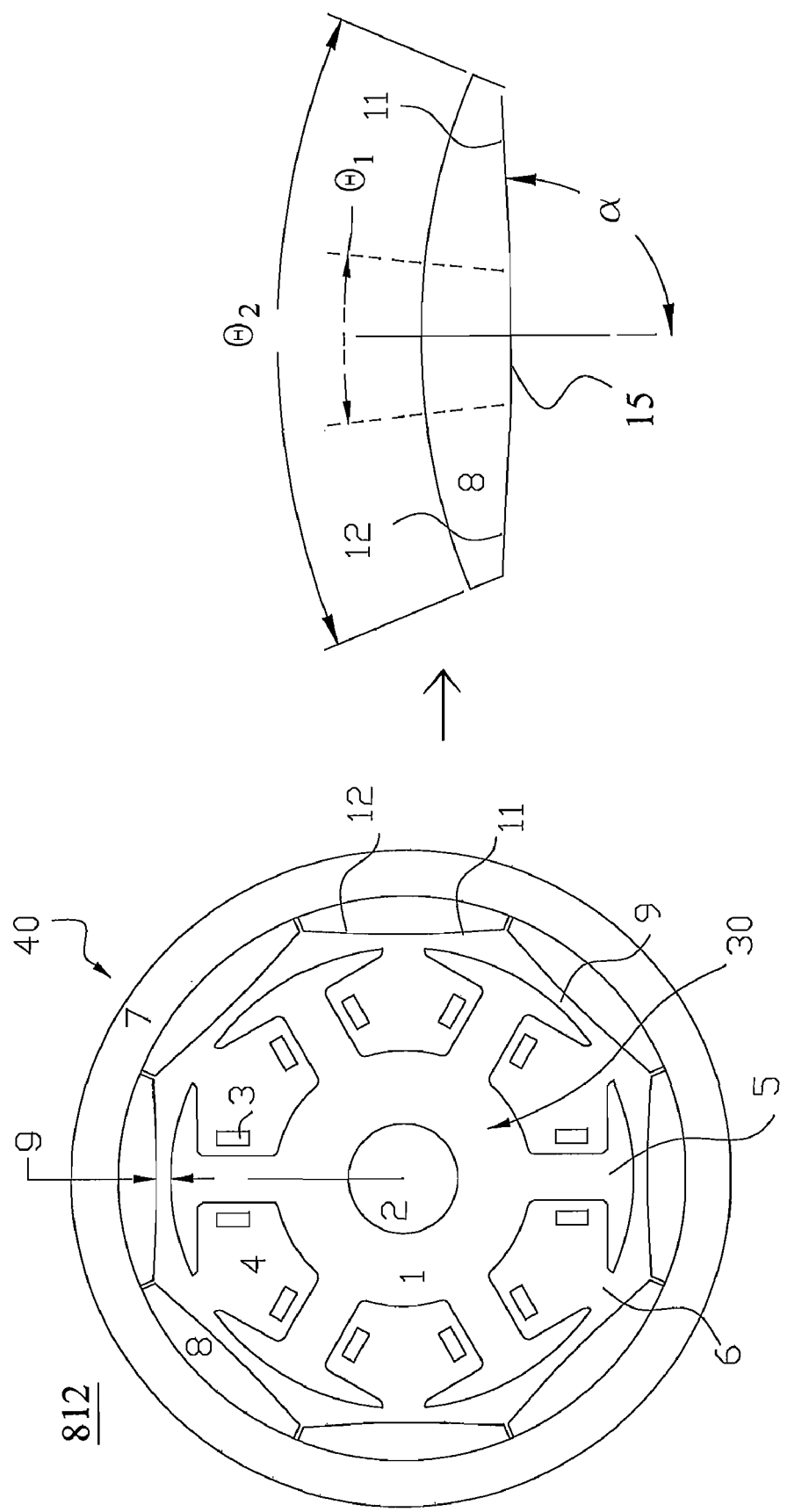
FIG. 12 is a cross-section diagram showing a rotary structure of a permanent magnet electric machine according to the second embodiment of the present invention.

Please refer to FIG. 12, which is a cross-section diagram showing a rotary structure of a permanent magnet electric machine according to the second embodiment of the present invention. The rotary structure 812 of a permanent magnet electric machine in FIG. 12 is another permanent magnet motor having eight poles and six slots. Except inclined surfaces 11 and 12 of the permanent magnet 8 and middle planes, the definitions and symbols of respective components for the rotary structure 812 of the present embodiment are the same as those for the embodiment shown in FIG. 3. The feature of the present embodiment lies in that the middle of an inward surface of each permanent magnet forms a middle plane 15 for replacing the arc surface 14 in FIG. 3 and that inclined surfaces 11 and 12 are formed on two sides of the middle plane 15. Besides aforementioned advantages, such structure of the permanent magnet 8 also has advantages of convenient processing and saving material of permanent magnets and so on.

Figure 13:
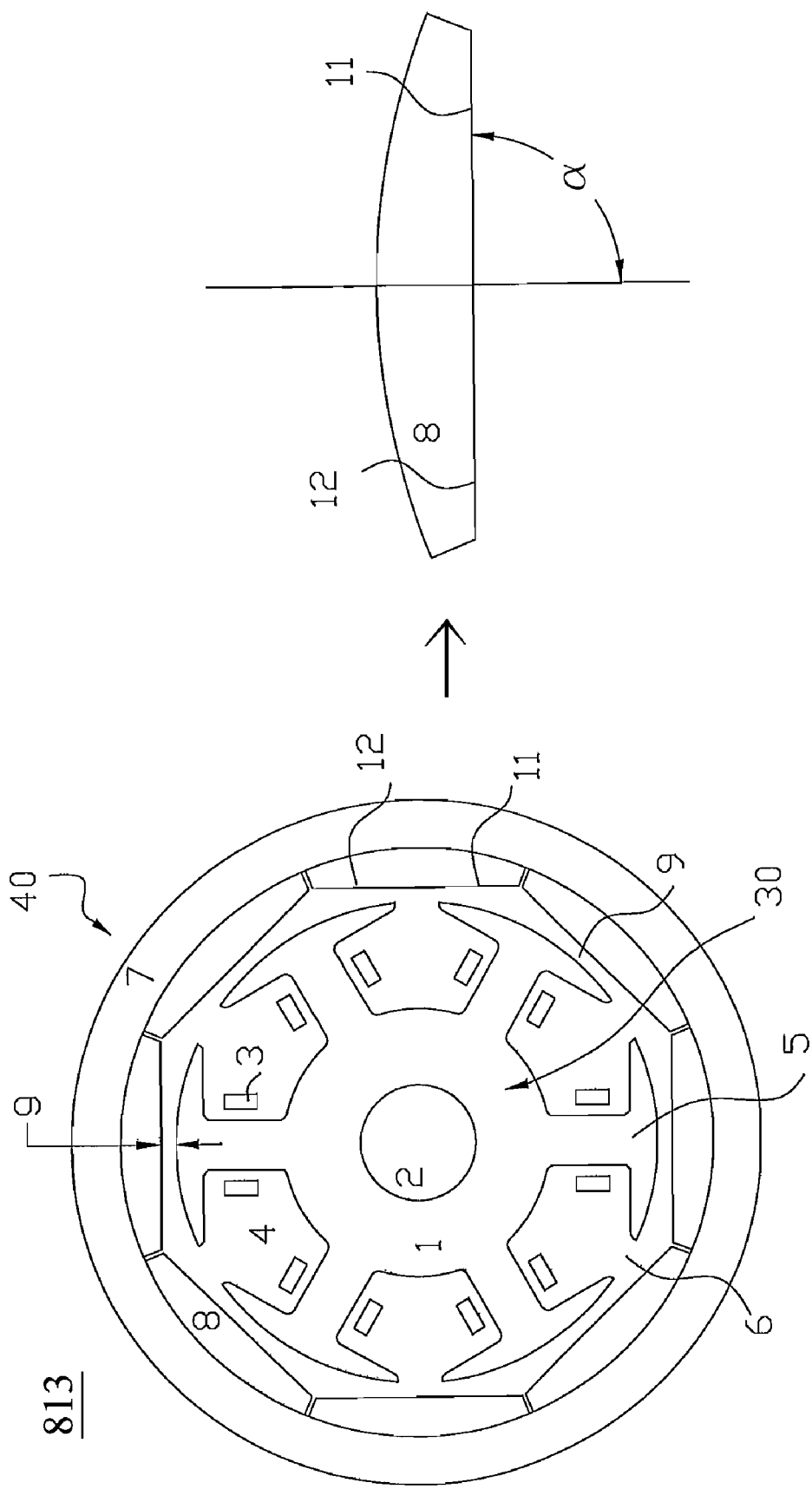
FIG. 13 is a cross-section diagram showing a rotary structure of a permanent magnet electric machine according to the third embodiment of the present invention.

Please refer to FIG. 13, which is a cross-section diagram showing a rotary structure of a permanent magnet electric machine according to the third embodiment of the present invention. The rotary structure 813 of the permanent magnet electric machine in FIG. 13 is the third permanent magnet motor having eight poles and six slots. Except inclined surfaces 11 and 12 of the permanent magnet 8, the definitions and symbols of respective components for the rotary structure 812 of the present embodiment are the same as those for the embodiment shown in FIG. 3. The feature of the present embodiment lies in that the inclined surfaces 11 and 12 are coplanar and the inclined angle α is 90 degrees. Besides aforementioned advantages, such structure of the permanent magnet 8 also has advantages of convenient processing and saving material of permanent magnets and so on.

According to the main feature of the present invention, each permanent magnet having two sides along a peripheral direction of the rotor includes a pair of inclined surfaces on the two sides for decreasing a cogging torque. The pair of inclined surfaces is symmetric with respect to a radial plane of the each permanent magnet. An inclined angle α between the inclined surface and the radial plane is selected from a range of 90(1−1/(4P))<α<90(1+1/(4P)). As a non-dimension angle in the peripheral direction corresponding to the pair of the inclined surfaces is selected from a range of $0.75\times P/K \leq \Psi_2-\Psi_1 \leq 1.125\times P/K$, the output torque decreases slightly but the cogging torque increases significantly, wherein $\Psi_1$ is a first pole arc ratio of the rotor and $\Psi_2$ is a second pole arc ratio of the rotor.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A rotary structure of a permanent magnet electric machine, comprising:

a stator having K salient teeth peripherally spaced with equal intervals for forming K winding slots, wherein K is a natural number greater than 1; and a rotor having an annular inner surface, having P pairs of permanent magnets peripherally spaced with equal intervals along the inner surface for rotating around the stator, wherein P is a natural number, wherein each permanent magnet having two sides along a peripheral direction of the rotor comprises a pair of inclined surfaces on the two sides, the pair of inclined surfaces is symmetric with respect to a radial plane of the each permanent magnet and an inclined angle α between the inclined surface and the radial plane is selected from a range of 90(1−1/(4P))<α<90(1+1/(4P)).

2. A rotary structure of a permanent magnet electric machine according to claim 1, wherein the stator further comprises:

a stator core with the K salient teeth being extensions of the stator core.

3. A rotary structure of a permanent magnet electric machine according to claim 1, wherein the rotor further comprises a rotor yoke with the P pairs of permanent magnets being mounted thereon.

4. A rotary structure of a permanent magnet electric machine according claim 1, wherein the inclined angle is 90°.

5. A rotary structure of a permanent magnet electric machine according to claim 1, wherein a non-dimension angle in the peripheral direction corresponding to the pair of the inclined surfaces is selected from a range of $0.75 \times P/K < \Psi_2 - \Psi_1 < 1.125 \times P/K$, wherein $\Psi_1$ is a first pole arc ratio of the each permanent magnet and $\Psi_2$ is a second pole arc ratio of the each permanent magnet.

6. A rotary structure of a permanent magnet electric machine according to claim 1, wherein a non-dimension angle in the peripheral direction corresponding to the pair of inclined surfaces is selected from a range of $0.5 < \Psi_2 - \Psi_1 < 0.75$, where $\Psi_1$ is a first pole arc ratio of the each permanent magnet and $\Psi_2$ is a second pole arc ratio of the each permanent magnet.

7. A rotary structure of a permanent magnet electric machine according claim 1, wherein the inclined surfaces are two planes.

8. A rotary structure of a permanent magnet electric machine according to claim 1, wherein the each magnet further comprises a middle plane between the pair of the inclined surfaces.

9. A rotary structure of a permanent magnet electric machine according to claim 1, wherein while the inclined angle is 90°, the inclined surfaces are coplanar.

10. A structure of a permanent magnet electric machine, comprising:
   a stator having K salient teeth protruding therefrom, wherein the K salient teeth are wound by K windings and peripherally spaced with equal intervals and K is a natural number greater than 1; and
   a rotor having an annular inner surface facing the stator and including P pairs of permanent magnets mounted thereon, wherein the P pairs of permanent magnets alternatively change magnetic polarities thereof and are peripherally spaced with equal intervals along a peripheral direction of the inner surface, for rotating around the stator, and P is a natural number,
   wherein each permanent magnet has two planes, each of which has an inclined angle α with respect to a radial plane of the stator and faces the stator, such that the angle α satisfies $90(1-1/(4P)) < \alpha < 90(1+1/(4P))$.

11. A structure of a permanent magnet electric machine according to claim 10, wherein the each permanent magnet further comprises an arc surface between the two planes.

12. A rotary structure of a permanent magnet electric machine according to claim 11, wherein a non-dimension angle corresponding to the two inclined surfaces in the peripheral direction is selected from a range of $0.75 \times P/K < \Psi_2 - \Psi_1 < 1.125 \times P/K$, wherein $\Psi_1$ is a first pole arc ratio of the arc surface and $\Psi_2$ is a second pole arc ratio of the each permanent magnet.

13. A rotary structure of a permanent magnet electric machine according claim 10, wherein the inclined angle is 90°.

* * * * *